July 11, 1933.  R. B. HEARN  1,917,885
TELEGRAPH REPEATER CIRCUIT
Filed Jan. 7, 1932
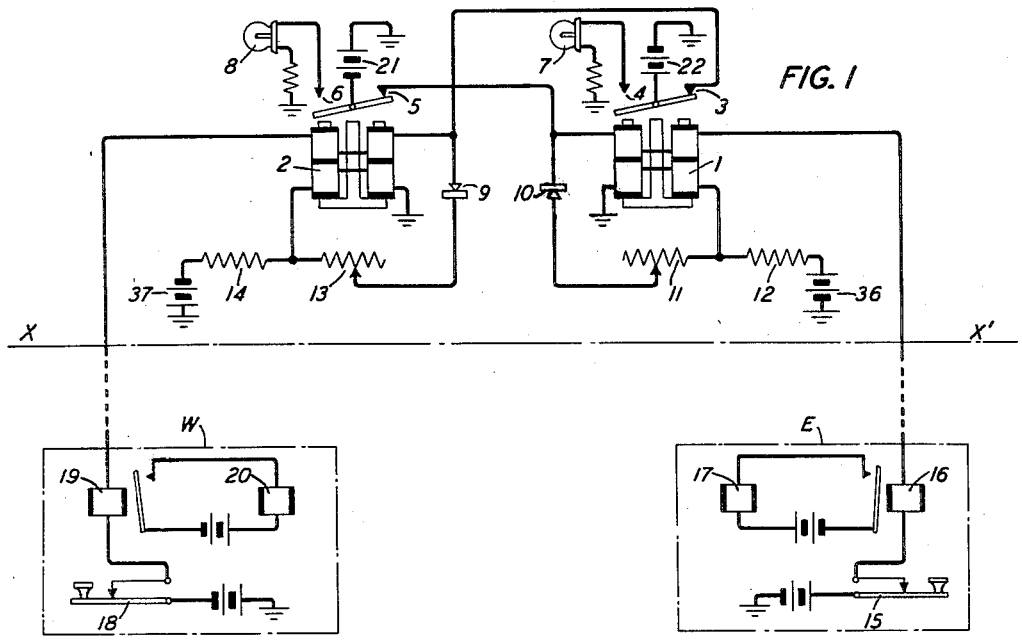
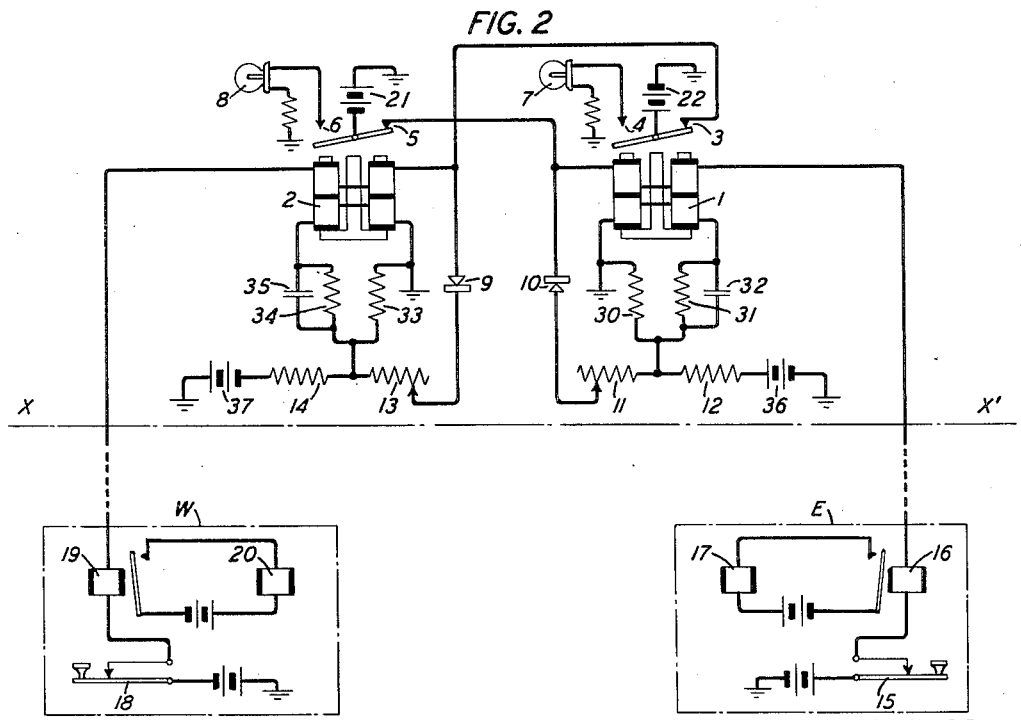
INVENTOR
R.B. HEARN
BY E.V. Griggs
ATTORNEY Patented July 11, 1933

1,917,885

UNITED STATES PATENT OFFICE

RICHARD B. HEARN, OF BROOKLYN, NEW YORK, ASSIGNOR TO BELL TELEPHONE LABORATORIES, INCORPORATED, OF NEW YORK, N. Y., A CORPORATION OF NEW YORK

TELEGRAPH REPEATER CIRCUIT

Application filed January 7, 1932. Serial No. 585,183.

This invention relates to telegraph systems and more particularly to repeater circuits for use therein for repeating signal impulses from one line section to another.

The object of the invention is to efficiently repeat signal impulses from one line section to another with a minimum amount of equipment.

Repeater circuits of the type utilizing polarized relays are well known in the art, a typical arrangement of this nature being described in Patent No. 1,479,430, issued January 1, 1924, to J. M. Fell. These circuits usually comprise, in general, two pairs of polarized relays, each relay of the pair having two windings, one winding connected in series with the line and known as the "line" winding and the other winding connected in series in a local circuit and known as the "biasing" or "opposing" winding. The local windings of each pair of relays are connected to two batteries of opposite polarity, one battery being directly connected to the windings and the other battery being connected through a contact of one of the relays in the opposite pair. A potentiometer arrangement is associated with the local windings and batteries and is so designed that when the battery circuits of both pairs of relays are closed the current in the local windings of a pair of relays is in a direction to oppose the action of the current in the line windings of the same pair of relays but when one battery circuit is opened at the contact of a relay in the opposite pair, the direction of the current through the local windings of the first pair of relays is reversed and it then acts in conjunction with the energy of the line windings. The reasons why it is desirable that this general method of operation be followed will be evident from the detailed description which follows of the circuit constituting this invention.

The repeater circuit of this invention is an improvement over the type of repeater circuit referred to above in that, while the general method of operation and the advantages thereof have been retained, one relay of each pair has been dispensed with and the local battery and potentiometer arrangements have been connected directly to the remaining relays. This, of course, results in a great saving in cost, a simplified wiring arrangement, a saving in the space necessary for mounting the apparatus and in other advantages which will be apparent.

According to a feature of the invention, a unilateral conductive device, such for example as a copper-oxide rectifier, is so associated with each relay as to properly isolate the "line" and "biasing" circuits thereof.

According to a second feature of the invention, an arrangement has been associated directly with the biasing winding of each relay for accelerating the action thereof. Repeater circuits have, of course, been previously proposed in which arrangements have been included for accelerating the biasing action, but in all of these, so far as applicant is aware, the provision of such arrangement has resulted in the addition of a third winding to the relay. It is, of course, desirable to obtain the advantages of the accelerating feature without an attendant increase in size of the relays.

The operation of the repeater circuit contemplated by this invention, as well as the advantages thereof, will be apparent from the following description when considered in connection with the accompanying drawing in which:

Fig. 1 shows a repeater circuit embodying the first mentioned feature of the invention; and Fig. 2 shows the circuit modified in accordance with the second feature.

Referring now to Fig. 1, the repeater circuit per se is shown above the line XX', it being arranged to repeat signals from station E to station W and vice versa. This repeater circuit is of the so-called single-line type, i. e., it is adapted to repeat impulses in only one direction at a time. The portion of the repeater associated with station E comprises a polarized relay 1 having an upper or line winding and a lower or biasing winding and a "marking" contact 3 and a "spacing" contact 4. Associated with the spacing contact is a lamp 7 which together with a similarly connected lamp 8 at the relay of the W portion of the repeater serves as an indicator of the direction of traffic through the repeater. A copper-oxide rectifier 10 and a potentiometer arrangement comprising resistances 11 and 12 are associated with the windings of the relay. To provide for proper adjustment of the potentiometer, resistance 11 is variable. The apparatus at station E comprises a relay 16 in series with the line and a normally closed key 15 also in series with the line. The operation of sounder 17 is controlled by relay 16.

The apparatus at station W and the portion of the repeater associated therewith is similar to that of station E and will not therefore be described in detail.

In order that a proper understanding of the invention may be arrived at, the operation of the repeater circuit in repeating impulses from station E to station W will now be described.

Assuming that both sets E and W are idle, a circuit is closed to feed positive battery 22, through marking contact 3 of polarized relay 1, after which it divides, one part going through the upper or "line" winding of polarized relay 2 and continuing through relay 19 and key 18 at subscriber's station W to negative battery and the other part going through rectifier 9 and resistance 13 at which point it divides, one part passing through resistance 14 to negative battery 37 and the other part through the lower or "biasing" winding of relay 2 to ground. The direction of the current through the upper winding of relay 2 is such as to hold the armature on marking contact 5 while that of the current through the lower winding is such as to operate the armature to spacing contact 6. The value of resistance 13 is so determined, however, that the value of the current passing through the upper winding is approximately twice that of the current passing through the lower winding and the armature is therefore held on the marking contact 5.

A similar circuit may also be traced through which negative battery 21 is fed through marking contact 5 of polarized relay 2 after which it divides one part passing through the upper or "line" winding of polarized relay 1, through relay 16 and key 15 at subscriber's station E to positive battery and the other part passing through rectifier 10 and resistance 11 where it divides, one part passing through the lower or "biasing" winding of relay 1 to ground and the other part passing through resistance 12 to positive battery. The direction of the current through the upper winding of relay 1 is such as to hold the armature on marking contact 3 while that of the current through the lower winding is such as to operate the armature to spacing contact 4. The value of resistance 11 is so determined, however, that the value of the current through the upper winding is approximately twice that of the current through the lower winding and the armature is therefore held on contact 3.

In order to clarify the above description, and to properly point out the similarity of the operation of relay 1 and relay 2, the circuit has been traced beginning at the negative pole of battery 21. It will be evident, of course, that I might have traced the same circuit beginning with the positive pole of battery 21 to ground and then, on the one hand, passing from ground through the lower winding of relay 1, resistance 11, rectifier 10, contact 5 of relay 2 to negative pole of battery 21, and on the other hand, passing from ground through battery 36 and resistance 12 to join the circuit through resistance 11 and rectifier 10 previously traced. In this instance the circuit through local relay 16 would also be traced from positive pole of battery 21 to ground and then through battery, key 15, relay 16, upper or line winding of relay 1, contact 5 of relay 2 to negative pole of battery 21.

Assuming now that subscriber E "sends" by opening his key, the circuit previously traced from negative battery 21 through the line winding of relay 1 is interrupted at key 15 and the armature of relay 1 will be operated to spacing contact 4 by the current through the lower or biasing winding. The operation of relay 1 to its spacing contact 4, interrupts the circuit previously traced from positive battery 22 through the line winding of relay 2 to negative battery at station W and through the rectifier 9 and resistance 13 to ground through the biasing winding of the relay and to negative battery through resistance 14. Before the current through the line winding of relay 2 has decreased to zero, however, the current previously passing through resistance 13 and the biasing winding which, it will be remembered, was in a direction tending to operate the armature to contact 6, is replaced by current from negative battery through resistance 14 and biasing winding to ground which is in the opposite direction and therefore tends to hold the armature on contact 5. The armature of relay 2 will therefore be held on marking contact 5 even though the circuit through the line winding has been interrupted. The rectifier 9 prevents current from negative battery at station W from passing through the upper winding of relay 2, resistance 13, lower winding of relay 2 to ground.

It will be understood that during the time station E is sending, relay 19 at station W (and the sounding device 20 controlled thereby) will be operated in step with key 15. That is, each time the circuit is interrupted at key 15, the circuit from positive battery 22 through relays 2 and 19 and key 18 to negative battery is interrupted as described above and relay 19 is thus deenergized and falls off closing the circuit through sounder 20. Also when the key is released to again complete the circuit and operate relay 1 to contact 3, the operating circuit from battery 22 through relay 19 is restored and relay 19 will operate and open the circuit through sounder 20.

During sending by station E, lamp 7 will be lighted each time the armature of relay 1 is operated to contact 4 and extinguished when the armature moves back to contact 3. The flashing of this lamp indicates to the repeater attendant that the impulses are passing from station E to station W. When W is sending to E, lamp 8 is lighted in a similar manner thus indicating transmission from W to E.

As sending from W to E is accomplished in the same manner as from E to W described above, it will not be described in detail. It will be noted, however, that should W attempt to send while the line at key 15 is open, it will have no effect on the repeater as the armature of relay 1 is operated to contact 4 and the armature of relay 2 is controlled by the current in the bias winding and is not affected by the condition of key 18.

Referring now to Fig. 2, the repeater circuit shown is the same as that of Fig. 1, except that an arrangement for accelerating the action of the biasing winding has been added. This arrangement, referring to relay 1, comprises two resistances 30 and 31 and a condenser 32. The functioning of this network depends, in general, upon the charging of the condenser 32 during the flow of current in one direction and, upon the interruption of this current, the resultant discharge of the condenser in a direction to accelerate the action subsequently resulting from the reversal of direction of current through the biasing winding.

Considering only the portion of the circuits acting through the biasing windings of the relays and assuming that, as in the above described instance, both stations E and W are idle, positive battery 22 passes through rectifier 9 and resistance 13 where it divides, one part passing through resistance 14 and negative battery 37 to ground and the other part again dividing, approximately one-half passing through resistance 33 to ground and the other half through resistance 34 and the biasing winding of relay 2 to ground. The condenser 35 is now charged with a positive potential on the side nearer resistance 14 and negative battery. As pointed out above the direction of the current through biasing winding of relay 2 is now such as to tend to operate the armature to contact 6, but this is prevented by the greater strength of the current passing through the line winding in a direction tending to hold the armature on contact 5.

Assuming now that subscriber E opens his key 15, positive battery 22 is removed from the line as previously described and, the current through rectifier 9 being interrupted, the direction of the current through the biasing winding of relay 2 is changed and holds the armature on contact 5. The biasing current may now be traced from positive pole of battery 37 to ground, through the bias winding of relay 2, through resistances 34 and 14 to negative pole of battery. In this instance, however, the reversal of direction of the current through the bias winding is accelerated by the discharge of the condenser which takes place the instant the flow of current from battery 22 has been interrupted. During the flow of current in this direction through the bias winding condenser 35 again becomes charged but this time in the opposite direction, i. e. with a positive potential on the side nearer the winding of relay 2. When, due to the operation of relay 1 to contact 3, the interruption of the biasing current in the direction last traced is effected, condenser 35 again discharges this time in a direction to accelerate the biasing current in the direction which tends to operate relay 2 to contact 6.

As the action of the accelerating network provided for relay 1 is the same as that just described in connection with relay 2, it does not appear necessary to describe its operation in detail.

Although the specification has referred particularly to the use of copper-oxide rectifiers, the invention is not so limited but contemplates the use of other types of unilateral conductive devices.

What is claimed is:

1. A telegraph repeater circuit including a polarized relay provided with two windings a battery associated with each winding, the terminals of said batteries electrically adjacent the respectively associated windings being of opposite polarity and a polarity discriminative device connected between the two windings.

2. A telegraph repeater circuit including a polarized relay having two windings, a battery directly connected to one of the windings a second battery connected to the other winding through a contact of a second relay, the terminal of said second battery electrically adjacent its associated winding being of opposite polarity with respect to the analogous terminal of the first battery and a polarity discriminative device connected between the two windings.

3. A telegraph repeater circuit including a polarized relay having two windings, a battery of one polarity being connected to one winding through a contact of a second relay and a battery of opposite polarity, being directly connected to the second winding and a unilateral conductive device connected between the two windings.

4. In a telegraph repeater circuit, a polarized relay provided with two windings and means connected between the two windings for allowing impulses of one polarity to flow through the two windings in parallel and for preventing impulses of opposite polarity from flowing through one of the windings.

5. In a telegraph repeater circuit, a polarized relay provided with two windings and means connected between the two windings for allowing impulses of one polarity to flow through the two windings in parallel and for preventing impulses of opposite polarity from flowing through the two windings in parallel.

6. In a telegraph repeater circuit, a polarized relay provided with two windings, a battery of one polarity connected in parallel with the two windings through the contacts of a second relay, a second battery differing in polarity with respect to the first mentioned battery also connected in parallel with the two windings and means connected between the two windings for preventing impulses of one of the batteries from flowing in one of the windings.

7. In a telegraph system, two line sections and means for repeating signal impulses between said line sections including two polarized relays each provided with two windings, one winding of each relay being connected in series with a respective line section and the other winding of each relay being connected to a battery and potentiometer arrangement, a unilateral conductive device being connected between the two windings of each relay.

8. A telegraph repeater circuit of the type which employs polar relays for repeating telegraph signal impulses between transmission line sections, each of said relays having a plurality of windings, characterized in this, that a rectifier is connected at one end of the circuit for preventing the reversal of the direction of the flow of current through one winding of one of said relays.

9. A telegraph repeater circuit comprising two polar relays, each of said relays having a line winding and a biasing winding, a rectifier serially connected between the line and biasing winding of each of said two polar relays, two transmission line sections, said line sections being individually connected to one side of a line winding, the other side of each of said line windings being connected to a contact on the relay associated with the other line winding.

10. A single line telegraph repeater circuit of the type which employs two polar relays for repeating signal impulses between transmission line sections, each of said relays having a line winding and a biasing winding characterized in this that a copper oxide rectifier is connected between the line and biasing windings for preventing the reversal of the direction of the flow of current between said two windings.

11. A polarized relay having an armature and a line winding and a biasing winding, and means associated directly with the biasing winding for accelerating the action thereof said means comprising a resistance and capacity connected in parallel with each other and in series with one side of the biasing winding and a resistance connected in series with the other side of the biasing winding.

12. In a telegraph repeater circuit, a polarized relay having a line winding and a biasing winding, a unilateral conductive device connected between the two windings and a network, including capacity and resistance, associated directly with the biasing winding.

In witness whereof, I hereunto subscribe my name, this 6th day of January, 1932.

RICHARD B. HEARN.